(12) United States Patent
Koga

(10) Patent No.: US 11,335,487 B2
(45) Date of Patent: May 17, 2022

(54) MAGNETIC ERASER, WRITING SYSTEM AND DISPLAY DEVICE

(71) Applicant: Zero Lab Co., Ltd., Tokyo (JP)

(72) Inventor: Ritsuo Koga, Tokyo (JP)

(73) Assignee: ZERO LAB CO., LTD., Tokyo (JP)

(*) Notice: Subject to any disclaimer, the term of this patent is extended or adjusted under 35 U.S.C. 154(b) by 0 days.

(21) Appl. No.: 17/288,657

(22) PCT Filed: Oct. 29, 2019

(86) PCT No.: PCT/JP2019/042343
§ 371 (c)(1),
(2) Date: Apr. 26, 2021

(87) PCT Pub. No.: WO2020/090808
PCT Pub. Date: May 7, 2020

(65) Prior Publication Data
US 2021/0313105 A1    Oct. 7, 2021

(30) Foreign Application Priority Data

Nov. 1, 2018  (JP) .............................. JP2018-206307

(51) Int. Cl.
| | | |
|---|---|---|
| G02F 1/1673 | (2019.01) | |
| G02F 1/16757 | (2019.01) | |
| H01F 7/02 | (2006.01) | |
| B43L 1/00 | (2006.01) | |
| B43L 21/00 | (2006.01) | |

(52) U.S. Cl.
CPC ................ *H01F 7/02* (2013.01); *B43L 1/008* (2013.01); *B43L 21/00* (2013.01); *G02F 1/1673* (2019.01); *G02F 1/16757* (2019.01)

(58) Field of Classification Search
CPC .. B43L 1/00; B43L 21/00; B43L 1/008; G02F 1/09; G02F 1/094
See application file for complete search history.

(56) References Cited

U.S. PATENT DOCUMENTS

2018/0053452 A1*    2/2018    Koga ......................... G02F 1/09

FOREIGN PATENT DOCUMENTS

| JP | S63271286 A | 11/1988 |
|---|---|---|
| JP | 2000062393 A | 2/2000 |
| JP | 2001188485 A | 7/2001 |
| JP | 2003335094 A | 11/2003 |
| JP | 2004050593 A | 2/2004 |
| JP | 6213886 B1 | 10/2017 |
| WO | 2009090441 A2 | 7/2009 |

* cited by examiner

*Primary Examiner* — Brandi N Thomas
(74) *Attorney, Agent, or Firm* — Slater Matsil, LLP

(57) ABSTRACT

A magnetic eraser can be used for erasing markings drawn on a magnetic sheet. The magnetic eraser includes a housing with a magnet placed in the housing. The magnetic eraser also includes a first magnetic body placed between a first surface of the housing and the magnet. The first surface of the housing can provide a first erasing surface.

23 Claims, 13 Drawing Sheets

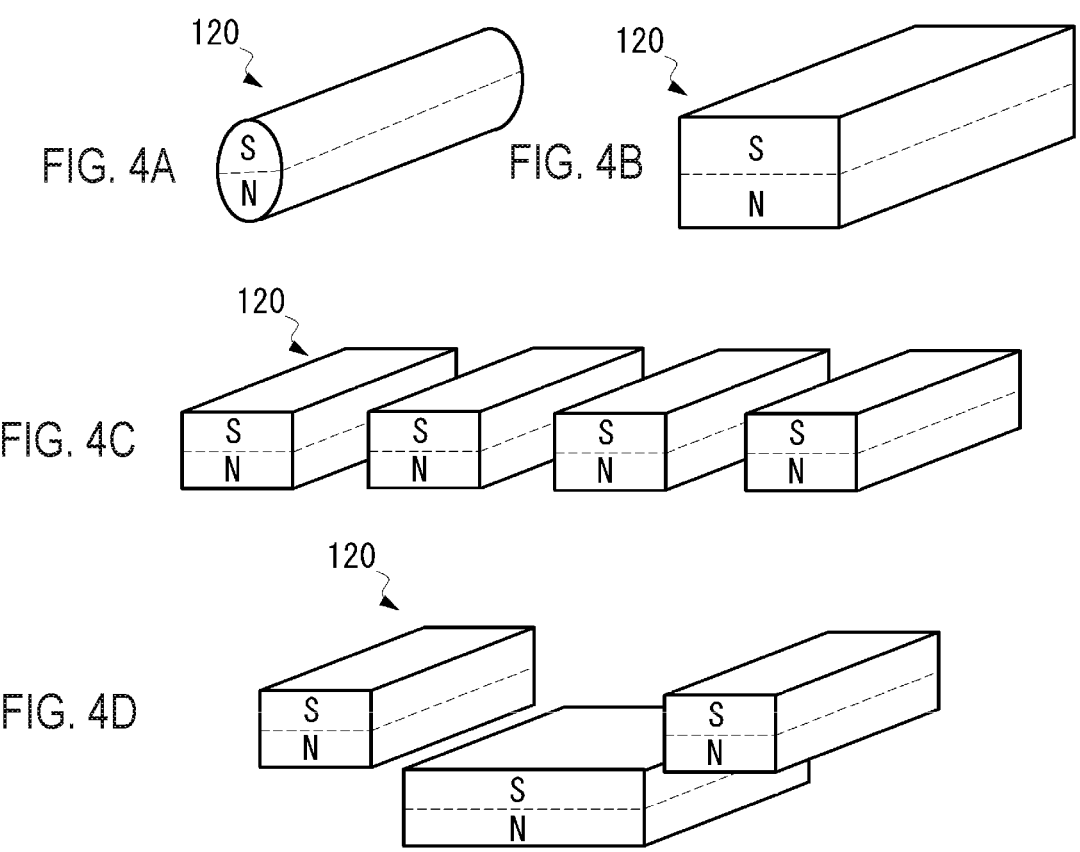

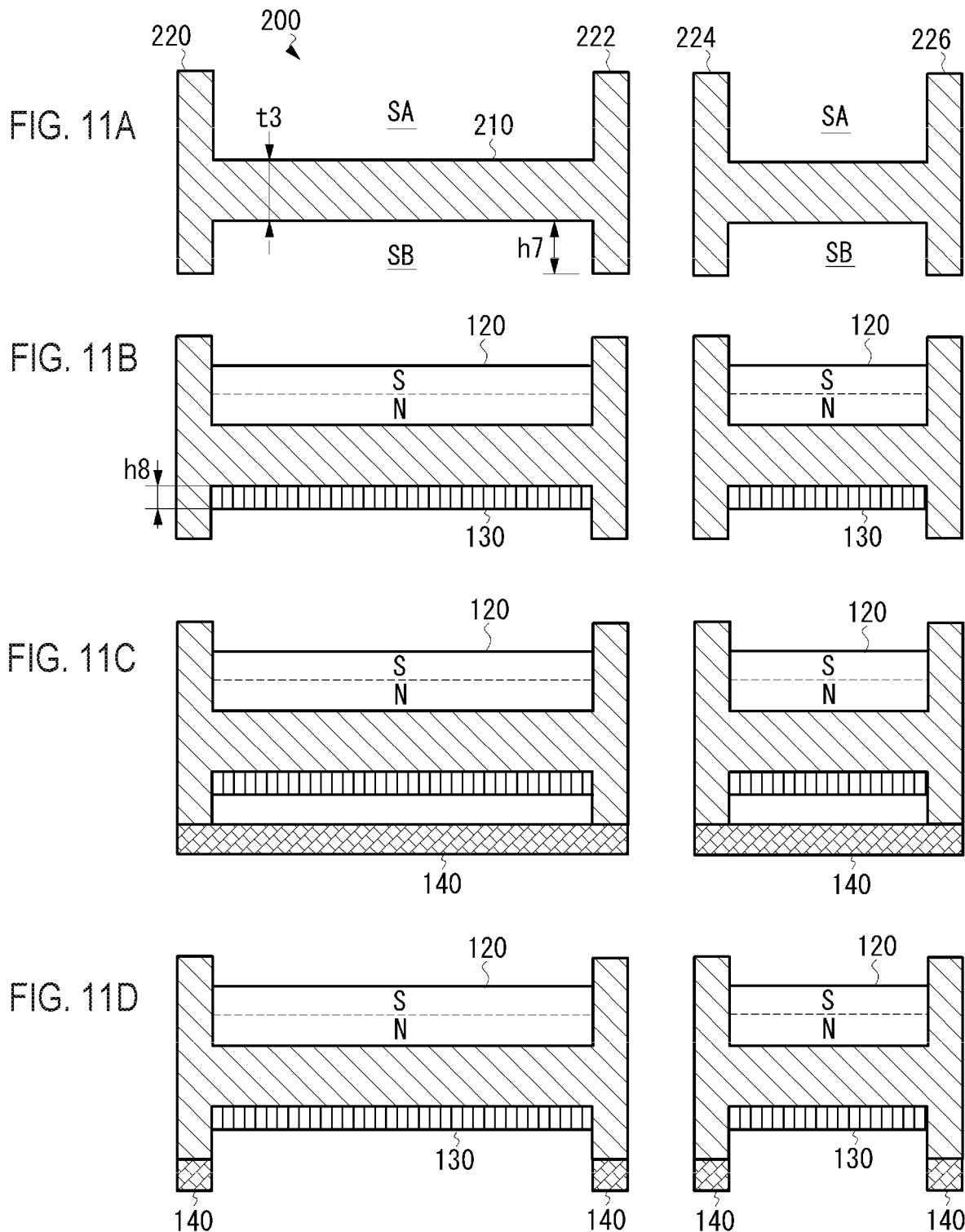

MAGNETIC ERASER, WRITING SYSTEM AND DISPLAY DEVICE

CROSS-REFERENCE TO RELATED APPLICATIONS

This application is a national stage of International Application No. PCT/JP2019/042343, filed on Oct. 29, 2019 which application is hereby incorporated herein by reference in its entirety. International Application No. PCT/JP2019/042343 claims priority to Japanese Patent Application 2018-206307 filed on Nov. 1, 2018, which is also incorporated herein by reference in its entirety.

TECHNICAL FIELD

The present invention relates to a magnetic eraser, a writing system, and a display device for erasing characters, figures and/or symbols etc. drawn on a magnetic sheet.

BACKGROUND

A magnetic sheet (or a magnetic display panel) on which a plurality of microcapsules having magnetic particles are planarly placed has been utilized. In such a magnetic sheet, the magnetic particles in the microcapsules are acted by the magnetic field from a magnetic pen so that desired characters, symbols, pictures or the like are drawn. Characters etc. drawn on the magnetic sheet can be erased by the magnetic field from a magnetic eraser acting on a drawing surface of the magnetic sheet. The patent document 1 discloses a magnetic eraser that rotates a magnet in a housing to vary the magnetic field, thereby evenly and cleanly erasing characters etc. drawn on a magnetic sheet. JP patent no. 6,213,886B and U.S. application Ser. No. 15/679,767, which claims priority to JP patent no. 6,213, 886B, disclose subject matter related to subject matter disclosed herein.

SUMMARY

An example of a magnetic sheet is shown in FIG. 1. A magnetic sheet 10 includes a transparent front sheet 20 through which the magnetic field can penetrate, a back sheet 30, and a plurality of microcapsules 40 placed dimensionally in a space between the transparent front sheet 20 and the back sheet 30. The plurality of microcapsules 40 may be accommodated by a case (not shown). For example, the microcapsules 40 may include magnetic particles, non-magnetic particles such as white titanium oxide, dispersions, and additives or the like in a transparent spherical cell. The size of the microcapsule is, for example, 50-650 µm.

A magnetic sheet including such magnetophoresis-type microcapsules has the following features. When magnetic force lines in a direction generally perpendicular to the magnetic sheet act on the microcapsules, the magnetic particles are arranged in the direction of the magnetic force lines, so that characters etc. are drawn. On the other hand, when magnetic force lines in a direction generally horizontal (lateral) to the microcapsules act, the magnetic particles in the upper part of the microcapsule are moved, so that drawn characters etc. are erased and the drawing surface become white.

FIG. 2 is a sectional view showing a configuration of a conventional magnetic eraser. A magnetic eraser 50 includes a magnet 54 that is column-shaped or rectangular placed in, for example, a housing 52 that is rectangular. The bottom of the housing 52 is opened. The opened surface is covered by a sliding member 56 through which the magnetic field can penetrate. As shown in FIG. 1, when the magnetic eraser 50 is slid on the magnetic sheet 10, the magnetic force lines F directing from the N-pole to the S-pole of the magnet 54 act on the microcapsules. However, there is a problem that the magnetic force lines F acting in a direction horizontal to the microcapsules are insufficient, so that the erasure is not cleanly made and the screen after erasing can become not white but gray.

On the other hand, Japanese patent no. 6,213,886B discloses, when the magnet of the magnetic eraser is rotated to vary the magnetic field, the magnetic force lines in the horizontal direction may sufficiently act on the microcapsules. However, a driving component such as a motor, battery, gear or spring is required to vary the magnetic field, which makes a magnetic eraser to be bigger or high-cost.

The present invention can solve such conventional problems and intends to provide a magnetic eraser, a writing system, and a display device that are compact and cost-efficient and have an excellent erasing ability.

A magnetic eraser according to the present invention is to erase characters etc. drawn on a magnetic sheet, and includes a housing, at least one magnet placed in the housing, and a first magnetic body placed between a first surface of the housing and the magnet. The first surface of the housing provide a first erasing surface.

In an embodiment, the magnetic eraser further includes a second magnetic body placed between a second surface opposed to the first surface of the housing and the magnet. The second surface of the housing provides a second erasing surface. In an embodiment, the magnet is spaced a first distance apart from the first surface of the housing and spaced a second distance apart from the second surface of the housing. The first magnetic body controls magnetic force lines from the magnet. The second magnetic body controls magnetic force lines from the magnet. The first erasing surface and the second erasing surface have different erasing abilities. In an embodiment, the magnetic eraser further includes an adjusting means for varying the distance between the magnet and the first surface of the housing. In an embodiment, the adjusting means varies a distance h1 between the magnet and first magnetic body or a distance h2 between the first magnetic body and the first surface of the housing. In an embodiment, the housing includes a first housing portion for holding the magnet and a second housing portion for holding the first magnetic body. The adjusting means varies a relative position of a first holding portion and a second holding portion. In an embodiment, the housing includes a first housing portion for holding the magnet and the first housing and a second housing portion for holding the first surface of the housing. The adjusting means varies a relative position of a first holding portion and a second holding portion. In an embodiment, the magnetic eraser further includes a spacer formed of non-magnetic material between the magnet and the first magnetic body. The distance between the magnet and the first magnetic body is adjusted by the thickness of the spacer. In an embodiment, the spacer is a gap. In an embodiment, a sliding member of non-magnetic material is provided on the first surface of the housing. In an embodiment, a third magnetic body is attached to at least a part of the outside of the housing. In an embodiment, the housing is partitioned to a first space and a second space by a partition wall. The magnet is placed in the first space and the first magnetic body is placed in second space. The housing is formed of non-magnetic material. The distance between the magnet and the first magnetic body is adjusted by the thickness of the partition wall. In an embodiment, the first space has a shape for positioning the magnet and the second space has a shape for positioning the first magnetic body.

A display device according to the present invention includes the magnetic eraser described above and a magnetic sheet on which characters and figures etc. can be drawn by a magnetic pen and a magnetic stamp etc. When the magnetic eraser is moved on the magnetic sheet, drawn characters etc. can be erased.

According to the present invention, the intervention of the magnetic body between the magnet and the first surface of the housing enables the strength and direction of the magnetic forces acting on the magnetic sheet to be controlled, so that characters etc. can be cleanly erased. Besides, driving components for driving a magnet such as a motor, battery, gear, or spring are not required, which makes a magnetic eraser to be compact and cost-efficient.

BRIEF DESCRIPTION OF THE DRAWINGS

FIGS. 4A-4D depict diagrams showing configurations of the magnet according to the embodiments of the present invention.

FIG. 11A, FIG. 11B, FIG. 11C, and FIG. 11D depict sectional views of the housing of the magnetic eraser according to the seventh embodiment of the present invention.

Figure 1:
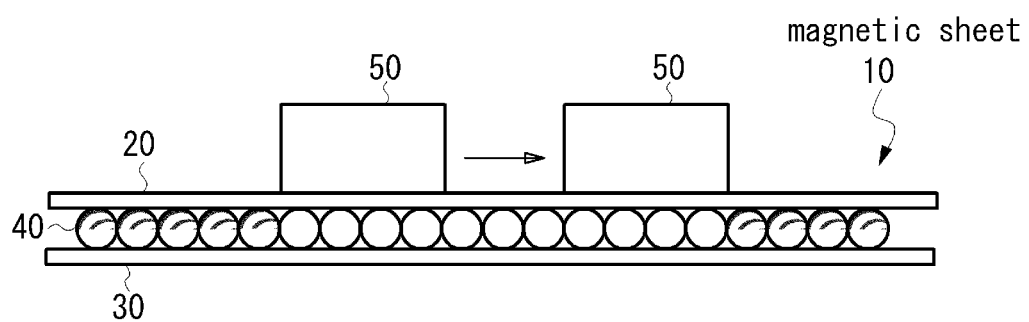
FIG. 1 is a schematic sectional view showing the configuration of the magnetic sheet.
Figure 2:
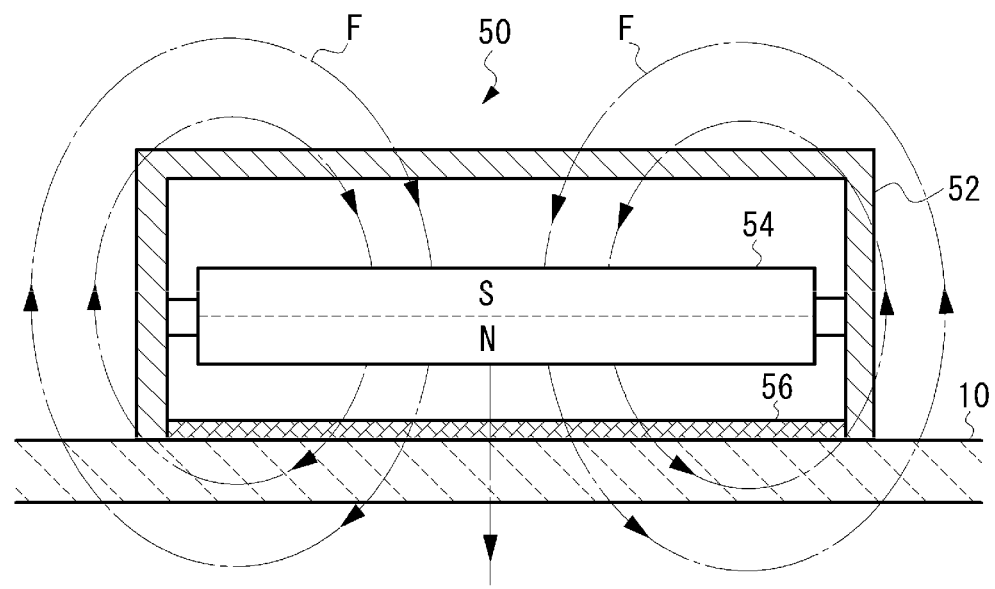
FIG. 2 is a schematic sectional view showing the configuration of the conventional magnetic eraser

The following reference numerals can be used in conjunction with the drawings:

100, 100A, 100B, 100C, 100D, 100E, 100F: magnetic eraser
110, 110A, 110B: housing
112: bottom surface
120: magnet
130: magnetic body
140: sliding member
150: small area erasing portion
160: outer magnetic body
170, 170A: spacer
180: operation portion
190: spring
200: housing
210: partition wall
300: mouse-shaped housing
SA, SB: upper space, lower space

DETAILED DESCRIPTION OF ILLUSTRATIVE EMBODIMENTS

Now, embodiments of the present invention are described in detail with reference to the drawings. A magnetic eraser according to the present invention has a function of erasing characters, figures, symbols or the like drawn on a magnetic sheet (or a magnetic display panel) by a magnetic pen. It should be noted that the drawings are not necessarily drawn to scale.

Figure 3A:
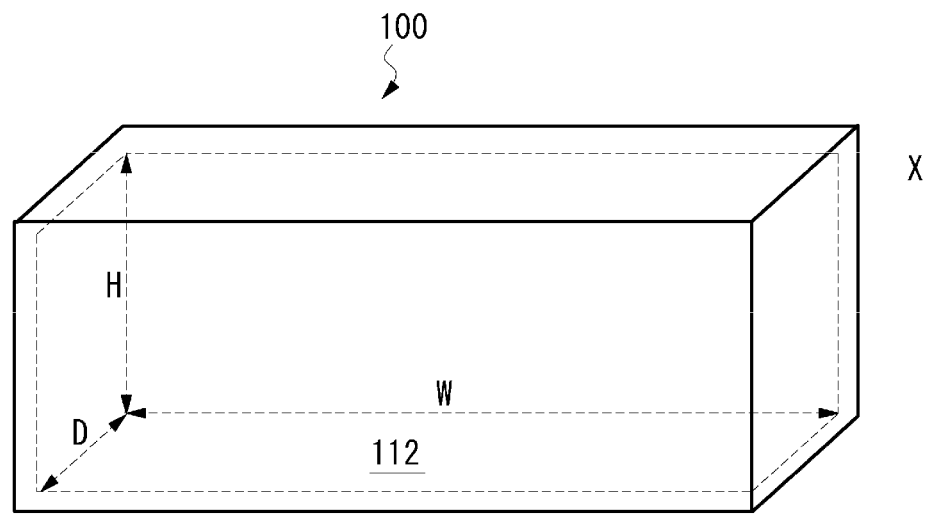
FIG. 3A is an external perspective view of the magnetic eraser according to the first embodiment of the present invention.
Figure 3B:
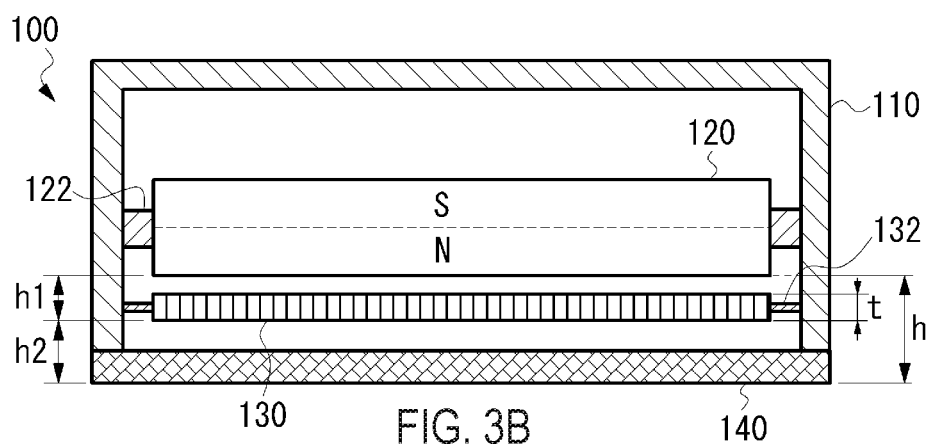
FIG. 3B is a sectional view in the longitudinal direction of FIG. 3A.
Figure 3C:
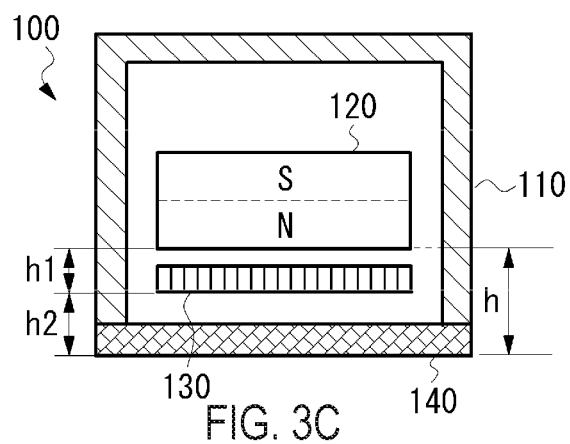
FIG. 3C is a sectional view in the lateral direction of FIG. 3A.

FIG. 3A is an external perspective view of the magnetic eraser according to the first embodiment of the present application, and FIG. 3B is a sectional view in the longitudinal direction thereof (referred to as longitudinal sectional view hereinafter), and FIG. 3C is a sectional view in the lateral direction thereof (referred to as lateral sectional view hereinafter). As shown in these drawings, a magnetic eraser 100 according to the embodiment includes a housing 110, a magnet 120 placed in the housing 110, and a magnetic body 130 placed in the position near the magnet 120, on which magnetic force lines act.

The housing 110 may have any shape such as a rectangular, oval-shaped, cylindrical, polygonal, or mouse-shaped shape. The housing 110 may be formed of any type of magnetic or non-magnetic materials such as plastic or metal. The housing 110 may have any size that is determined according to a size to be erased. In FIGS. 3A-3C, the rectangular housing 110 is illustrated.

The housing 110 has an inner space, and the bottom surface 112 is opened. The inner space may have any shape. In the illustration, the inner space has a rectangular shape with the width W, the depth D, and the height H according to the shape of the housing 110. In an embodiment, the opened bottom surface 112 of the housing 110 is covered by a sliding member 140 to smooth the slide of the magnetic eraser 100 on the magnetic sheet. The sliding member 140 is formed of, for example, a felt material through which a magnetic field can pass. The felt material enables a smooth slide and functions as an eraser for markers for whiteboards when the magnetic sheet is used as a whiteboard. The bottom surface 112 of the housing 110 is not necessarily covered with the sliding member 140.

The magnet 120 may have any shape such as a cylindrical magnet in which the N-pole and the S-pole are magnetized in the radial direction as shown in FIG. 4A and a prismatic magnet in which the N-pole and the S-pole are magnetized in the thickness direction as shown in FIG. 4B. One or more magnets 120 may be provided as shown in FIG. 4C. The plurality of magnets may be placed in the same plane as shown in FIG. 4C or placed in different planes to have steps as shown in FIG. 4D. In the latter case, the strength of the magnetic force lines differs according to the position of the magnets. In case of FIG. 4D, the strength of the magnetic force lines of the center magnet is higher than that of the side magnets, so that the erasing ability of the center portion is different from the erasing ability of the sides. In an embodiment, the magnet 120 is placed in the position with the height h from the bottom surface 112 of the housing 110 such that the N-pole is opposed to the bottom surface 112 of the housing 110. In an embodiment, the magnet 120 is placed in the position with the height h from the bottom surface 112 of the housing 110 such that the S-pole is opposed to the bottom surface 112 of the housing 110.

The bottom surface (the surface) of the housing 110 refers to the plane that slides to the magnetic sheet. If the sliding member 140 is provided, the bottom surface of the sliding member 140 is the bottom surface of the housing 110. If the sliding member 140 is not provided, the bottom surface of the housing 110 refers to the opened bottom surface of the housing 110.

The magnet 120 may have any size and any strength. At least, when the magnet 120 is positioned with the height h from the bottom surface of the housing 110, the magnet 120 may have the size and/or the strength in which the magnetic force lines of the magnet 120 act on the magnetic sheet. The magnet 120 may be placed in the housing 110 by any method. For example, the both ends of the magnet 120 may be fixed to the inner wall of the housing 110 by a fixing member 122.

Figure 4E:
FIGS. 4E-4k depict diagrams showing magnetic bodies according to the embodiments of the present invention.
Figure 4F:
Figure 4G:
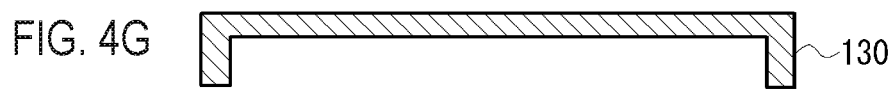
Figure 4H:
Figure 4I:
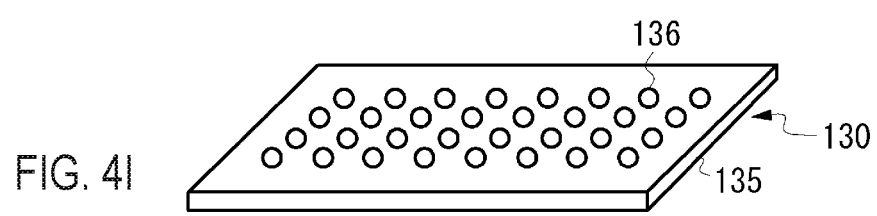
Figure 4J:
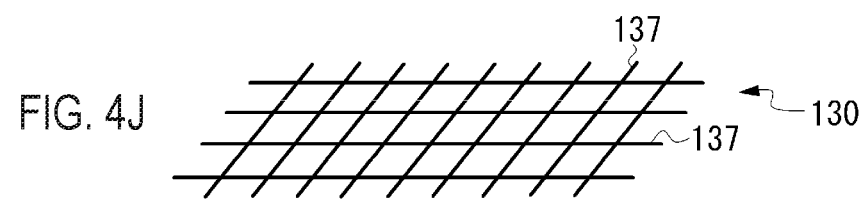
Figure 4K:
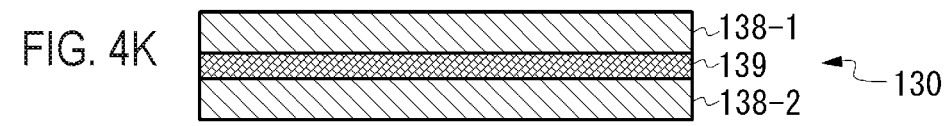

The magnetic body 130 is provided in the housing 110 to control the strength and/or distribution of the magnetic field the magnet 120 (x, y, and z directions). In other words, the magnetic body 130 controls the strength and/or direction of the magnetic force lines from the magnet 120 such that more magnetic force lines in the horizontal direction act on the microcapsules of the magnetic sheet. Thus, the magnetic permeability, shape, size, position, and/or number of the magnetic body 130 may be appropriately selected. When the distance from the magnet 120 is h1 and the distance from the magnet sheet is h2, the height h of the magnet 120 is h1+h2. The magnetic body 130 may have any shape or form. For example, the magnetic body 130 may be iron plate, a combination of materials having different permeability (such as laminated plate in which iron plates having different permeability are laminated), wire gauge, or iron ball. FIGS. 4E-FIG. 4K show some embodiments of the magnetic body according to the present invention. FIG. 4E shows a plate-shaped iron with the uniform thickness. FIG. 4F shows a plate-shaped iron with the different thicknesses. FIG. 4G shows an iron plate having leg potions bended downward from the ends of the plate-shaped main surface. FIG. 4H shows an iron plate having bended surfaces. FIG. 4K shows an example of the use of iron balls with a plurality of iron balls 136 placed on a plate-shaped member 135 of any material (magnetic or non-magnetic material). The iron balls 136 are placed, for example, in the recess formed on the plate-shaped member 135, and fixed to the plate-shaped member 135, for example, with a glue. FIG. 4J shows an example of a mesh-shaped wire gauge with a plurality of thread-like or wire-like irons 137 placed in the X and Y directions. FIG. 4K shows a laminated plate with iron plates laminated. Upper and lower magnetic plates 138-1, 138-2 are laminated with an intermediate member 139 through which the magnetic of, for example, plastic can pass. The permeability, shape and/or thickness of the upper and lower magnetic plate 138-1, 138-2 may be same or different. The upper and lower magnetic plate 138-1, 138-2 may be directly attached together without the intermediate member 139. These embodiments are just an example and various forms of magnetic body may be combined. For example, the wire gauge in FIG. 4J and the iron plate in FIG. 4G may be directly combined.

In the example of FIGS. 3A-3C, the magnetic body 130 is formed by a rectangular iron plate with the thickness t, and the magnetic body 130 is placed parallel to the magnet 120. The opposed surface of the magnetic body 130 to the magnet 120 has substantially the same size as the surface of the magnet 120. This relation is just an example. The surface of the magnet 130 may be smaller or larger than the surface of the magnet 120. The strength and direction of the magnetic force lines from the N-pole of the magnet 120 is controlled by the magnetic body 130 to direct to the S-pole. The distance between the magnet 120 and the magnetic body 130 as well as the permeability, shape and/or thickness of the magnetic body 130 may be main parameter for controlling the strength and direction of the magnetic force lines from the magnet 120. The first magnetic body 130 may be placed by any method. For example, the both ends of the first magnetic body 130 may be fixed to the inner wall of the housing 110 by a fixing member 132.

Figure 5:
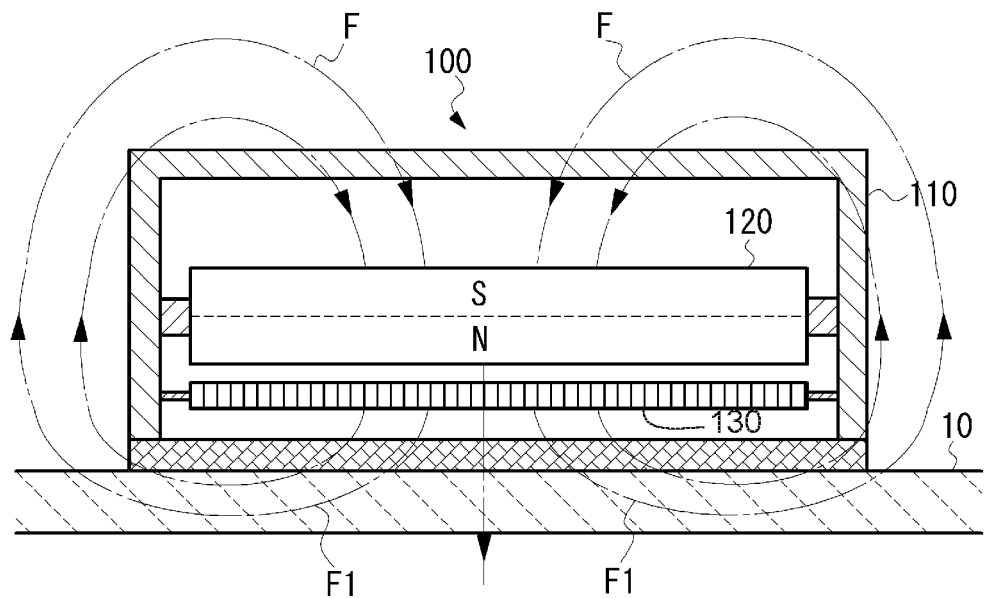
FIG. 5 is a diagram briefly showing the change of magnetic force lines of the magnet according to the embodiments of the present invention.

FIG. 5 shows a schematic diagram of the magnetic force lines when the magnetic body 130 is attached. When erasing characters or figures etc., the magnetic eraser 100 is slid on the magnetic sheet 10. At this time, the magnetic body 130 is intervened between the magnet 120 and the magnetic sheet. The strength and direction of the magnetic force lines F from the magnet 120 is controlled so that the magnetic force lines F1 horizontal to the microcapsules in the magnetic sheet act sufficiently. As a result, when erasing characters or figures etc. drawn on the magnetic sheet, the magnetic sheet become not gray but white, which makes the contrast to drawn characters strong. The magnetic sheet 10 may be used only for magnetic writing systems, or may be a part of an electronic whiteboard (blackboard) that can be drawn by markers or inks. That is, the drawing surface of an electronic whiteboard may be drawn by markers and magnetic pens, and both of characters etc. drawn by markers and magnetic pens may be erased together simultaneously by sliding the magnetic eraser 100. The magnetic sheet 10 may be a part of a screen that displays images projected by a projector. That is, the drawing surface of the magnetic sheet may be also used as a screen of a projector, so that characters etc. may be drawn by the magnetic pen on the screen on which images are being projected.

Figure 6:
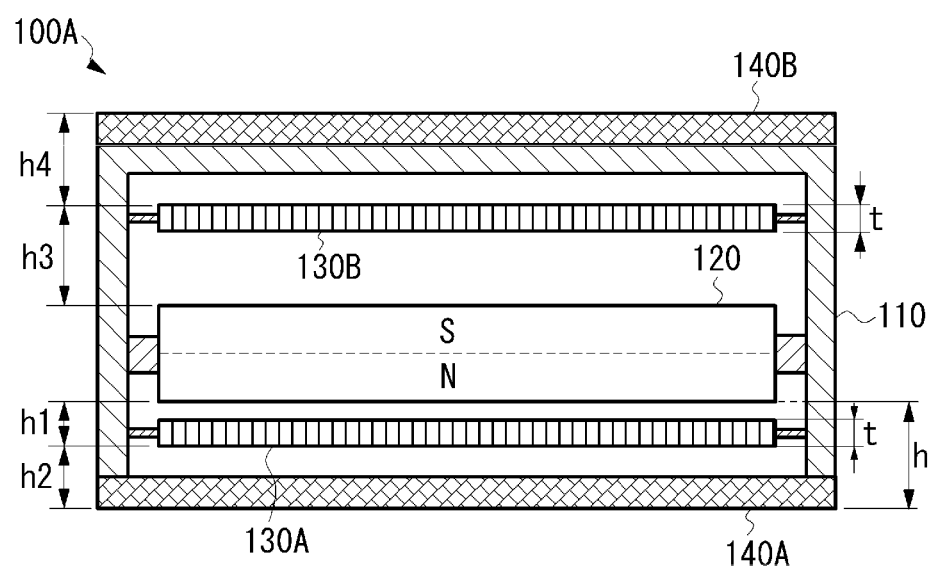
FIG. 6 is a schematic sectional view of the magnetic eraser according to the second embodiment of the present invention.

Now, the second embodiment according to the present invention is described. In first embodiment, the bottom surface (the plane to which the sliding member 140 is attached) of the housing 110 is used as an erasing surface. In the second embodiment, the surface opposed to the bottom surface of the housing is used as an erasing surface. FIG. 6 shows a longitudinal sectional view of a magnetic eraser 100A according to the second embodiment.

As shown in FIG. 5, a sliding member 140A is provided on the bottom surface of the housing 110, and a sliding member 140B is provided on the upper surface opposed to the bottom surface of the housing 110. The sliding member 140A provides a first erasing surface and the sliding member 140B provides a second erasing surface. As is the case with the first embodiment, in the inside of the housing 110, a first magnetic body 130 with the thickness t is placed between the magnet 120 and the sliding member 140A. In the second embodiment, a second magnetic body 130B with the thickness t is further placed between the magnet 120 and the sliding member 140B. The distance between the second magnetic body 130B and the magnet 120 is h3 and the distance between the second magnetic body 130B, and the upper surface (the sliding surface of the sliding member 140B in the embodiment) of the housing 110 is h4. There is a relation of (h1+h2)<(h3+h4). If the first magnetic body 130A and the second magnetic body 130B have the same size and are formed of the same material, the magnetic field in the first erasing surface is stronger than that of the second erasing surface, and the erasing ability of the first erasing surface is stronger than that of the second erasing surface. For example, when the erasure on the second erasing surface is not sufficient, the good erasure may be obtained on the first erasing surface.

Although the first magnetic body 130A and the second magnetic body 130B having the same size and materials are shown in the above embodiment, the first magnetic body 130A and the second magnetic body 130B may have different sizes and may be formed of different materials having different permeability.

Now, the third embodiment according to the present invention is described. As shown in FIG. 7, a magnetic eraser 100B according to the third embodiment includes an outer magnetic body 160 in the outside of the housing 110 to control the spread of the magnetic force lines. In this case, the housing 110 is formed of non-magnetic material such as plastic. The shape and/or size of the outer magnetic body 160 may be appropriately selected according to the shape and/or size of the magnet 120 as used. In the illustrated example, the outer magnetic body 160 has a thin plate shape. The outer magnetic body 160 is not necessarily provided continuously on the surfaces of the four sides of the housing 110. For example, the outer magnetic body 160 may be provided on one part, or may be provided on the longitudinally opposed surfaces.

Figure 8A:
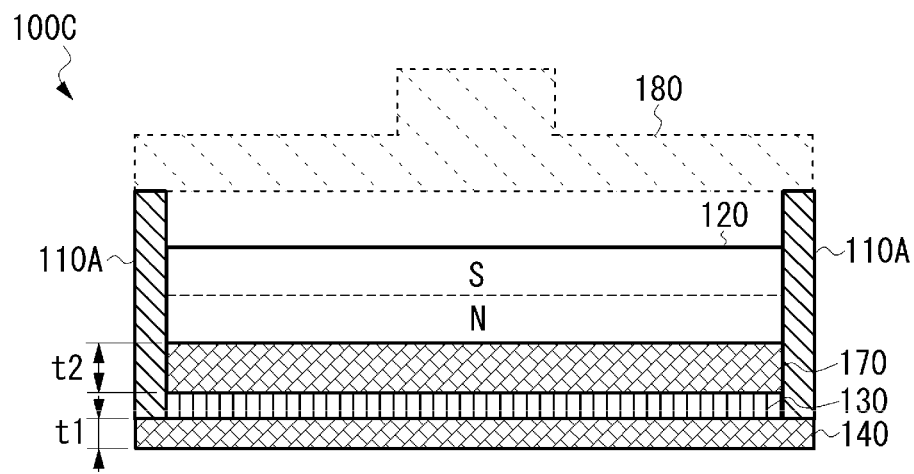
FIG. 8A and FIG. 8B depict schematic sectional views of the magnetic eraser according to the forth embodiment of the present invention.
Figure 8B:
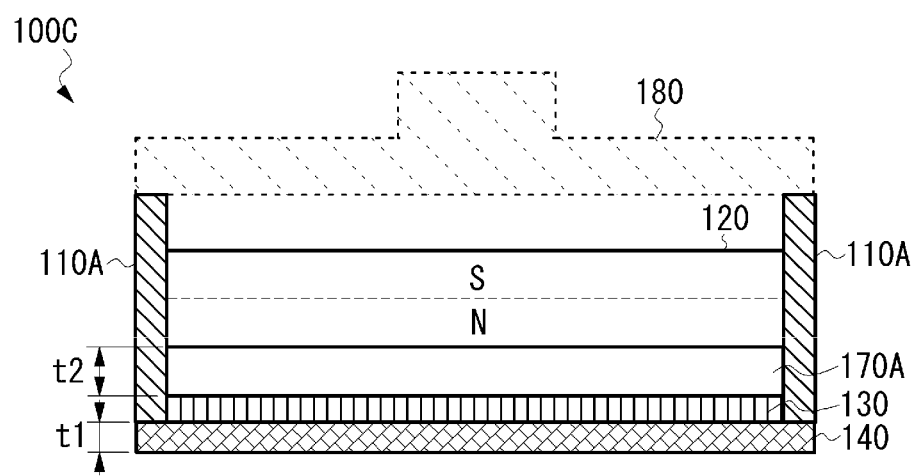

Now, the forth embodiment according to the present invention is described. FIGS. 8A and 8B show longitudinal sectional views of a magnetic eraser 100C according to the fourth embodiment. In the fourth embodiment, a spacer 170 formed of non-magnetic material is placed between the magnet 120 and the magnetic body 130. The space 170 has the thickness t2. A first surface of the spacer 170 is in contact to the magnet 120 and the second surface that is opposed to the first surface is in contact with the magnetic body 130. The sliding member 140 with the thickness t1 is attached to the bottom surface of the magnetic body 130. Thus, the distance h between the magnet 120 and the bottom surface of the housing 110A is adjusted by the thickness t2 of the spacer 170. FIG. 8B is an alternative example in which the spacer 170 of non-magnetic material is replaced with a gap 170A.

While the spacer 170 or the gap 170A is provided between the magnet 120 and the magnetic body 130 in the above embodiment, the spacer 170 or the gap 170A with the thickness t2 may be provided between the magnetic body 130 and the sliding member 140, so that the distance between the magnet 120 and the magnetic body 130 or the distance between the magnet 120 and the bottom surface of the housing 110A may be adjusted by the thickness t2 of the spacer 170 or the gap 170A.

Further, the housing 110A may be formed of magnetic body material. The upper surface of the first housing portion 110A may be opened or an operation portion 180 may be attached to the opened surface to slide the magnetic eraser.

Figure 9A:
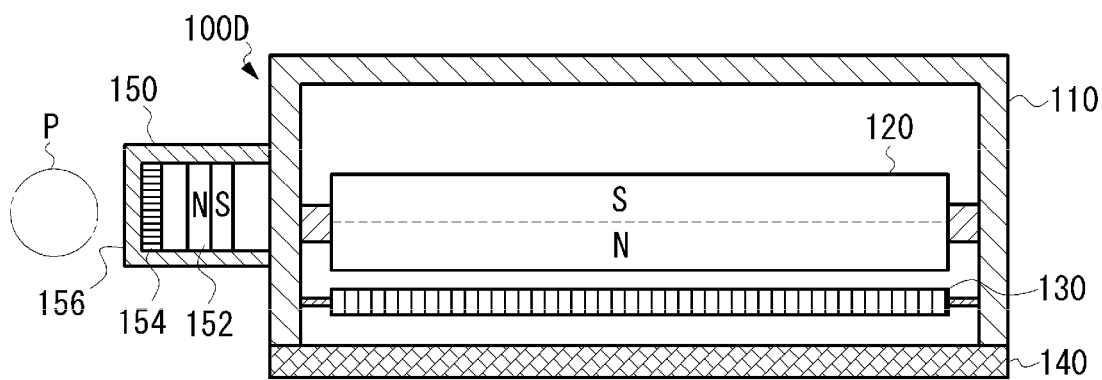
FIGS. 9A, and 9B depicts schematic sectional views of the magnetic eraser according to the fifth embodiment of the present invention.
Figure 9B:
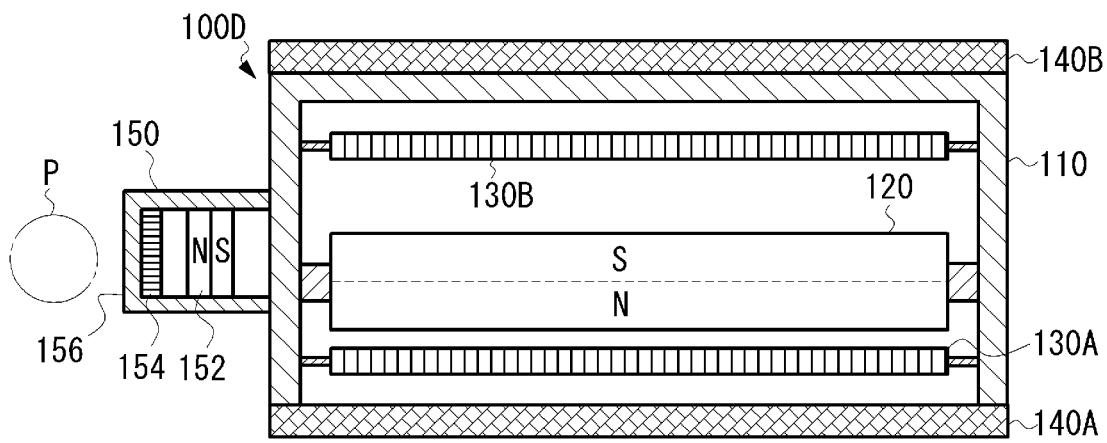

Now, the fifth embodiment according to the present invention is described. FIGS. 9A and 9B show longitudinal sectional views of the magnetic eraser according to the fifth embodiment. In a magnetic eraser 100D shown in FIG. 9A, a small area erasing portion 150 is provided on the side of the magnetic eraser 100 of the first embodiment. The erasing surface provided by the bottom surface of the housing 110 may erase a relatively wide area on the magnetic sheet at once. The small area erasing portion 150 may be used when a small area on the magnetic sheet should be erased.

Figure 7A:
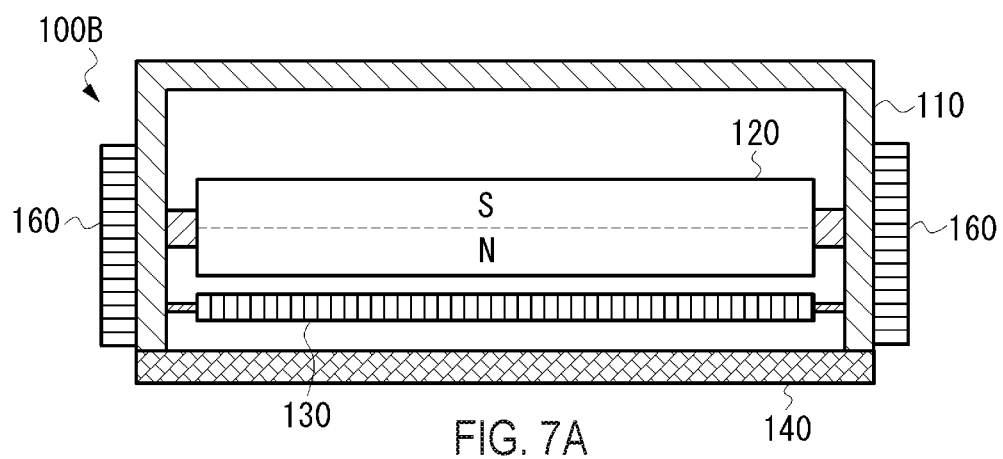
FIG. 7A and FIG. 7B depict schematic sectional views of the magnetic eraser according to the third embodiment of the present invention.
Figure 7B:
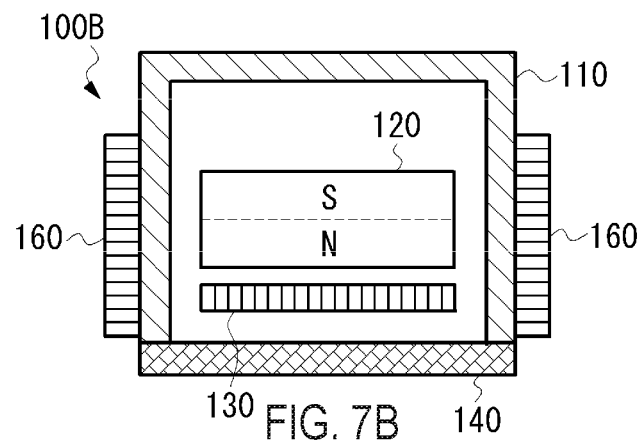

In an embodiment, the small area erasing portion 150 includes, for example, a cylindrical housing formed of non-magnetic material. In the cylindrical housing, a circular-shaped magnet 152 and a magnetic body 154 are placed. When the top end 156 of the cylindrical housing is slid on the magnetic sheet, the magnetic forces from the circular-shaped magnet 152 are controlled by the magnetic body 154 to act on the circular-shaped erasing area P. In the drawings, one small area erasing portion 150 is illustrated. However, another small area erasing portion may be provided on another side of the housing 110. In this case, it is desirable that each housing of the small area erasing portions has a different diameter to obtain a different erasing area. Further, in an embodiment, when the small area erasing portion 150 may be influenced by the magnetic force of the magnet 120, a magnetic body may be intervened between the small area erasing portion 150 and the magnet 120 to shield the influence of the magnetic force of the magnet 120. For example, the outer magnetic body 160 may be attached to the side surface of the housing 110 as shown in FIGS. 7A and 7B. Alternatively, the magnetic body may be attached to another location.

Figure 9C:
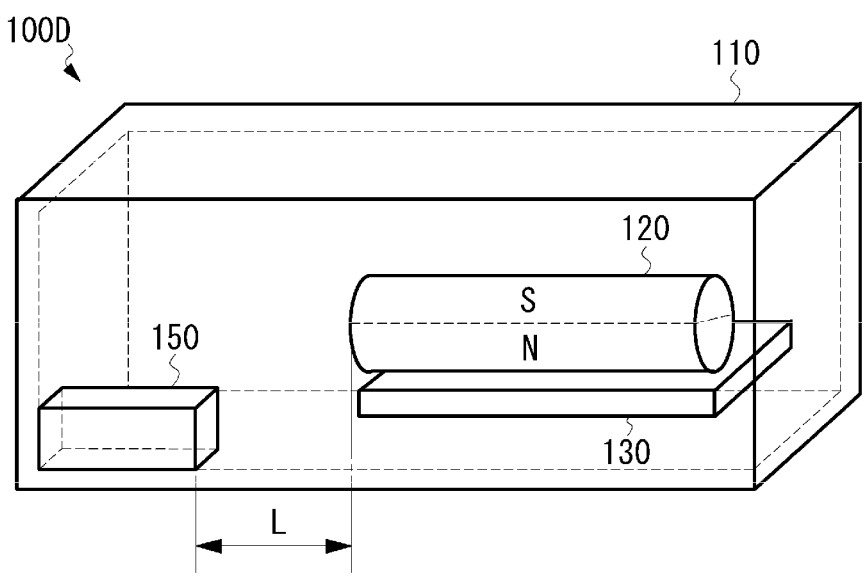
FIG. 9C depicts an example with the small area erasing portion provided at the corner in the housing.

FIG. 9B shows an example with the small area erasing portion 150 provided on the side of a magnetic eraser 100A of the second embodiment of the present invention. Not shown in FIG. 9B, the small area erasing portion may be provided on the side of the magnetic eraser 100B of the third embodiment (FIG. 7) or the side of the magnetic eraser 100C of the fourth embodiment (FIG. 8). FIG. 9C shows an example with the small area erasing portion 150 being rectangular and provided at the corner in the housing 110. The small area erasing portion 150 may be provided at a plurality of corner portions in the housing, respectively. In this case, each small area erasing portion 150 may have a different diameter to obtain a different erasing area. The user can erase a small portion of a character etc. by sliding the corner portion of the housing on the magnetic sheet. However, it is desirable that the small area erasing portion 150 is spaced a certain distance L apart from the magnet 120 or the magnetic body is intervened between the small area erasing portion 150 and the magnet 120, to avoid the influence of the magnetic field of the magnet 120.

Figure 10A:
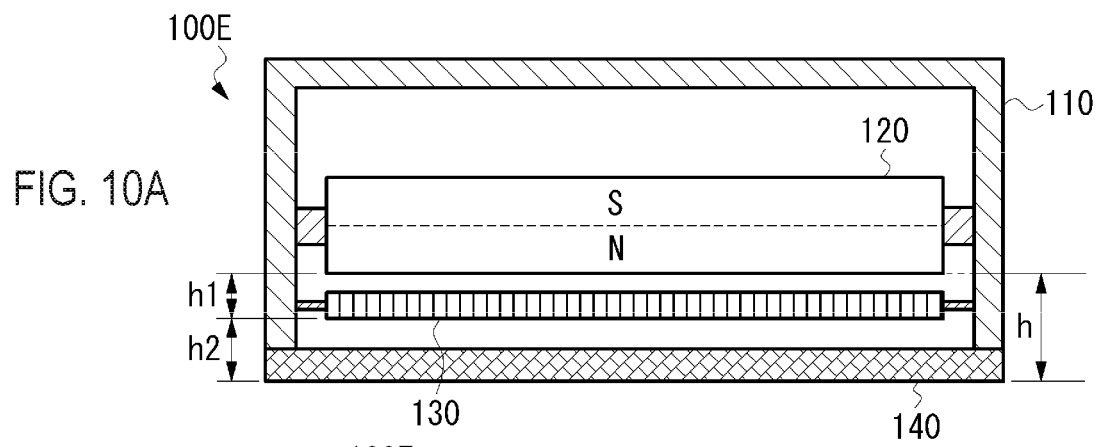
FIGS. 10A, 10B and 10C depict schematic sectional views of the magnetic eraser with the height h1 variable according to the sixth embodiment of the present invention.
Figure 10B:
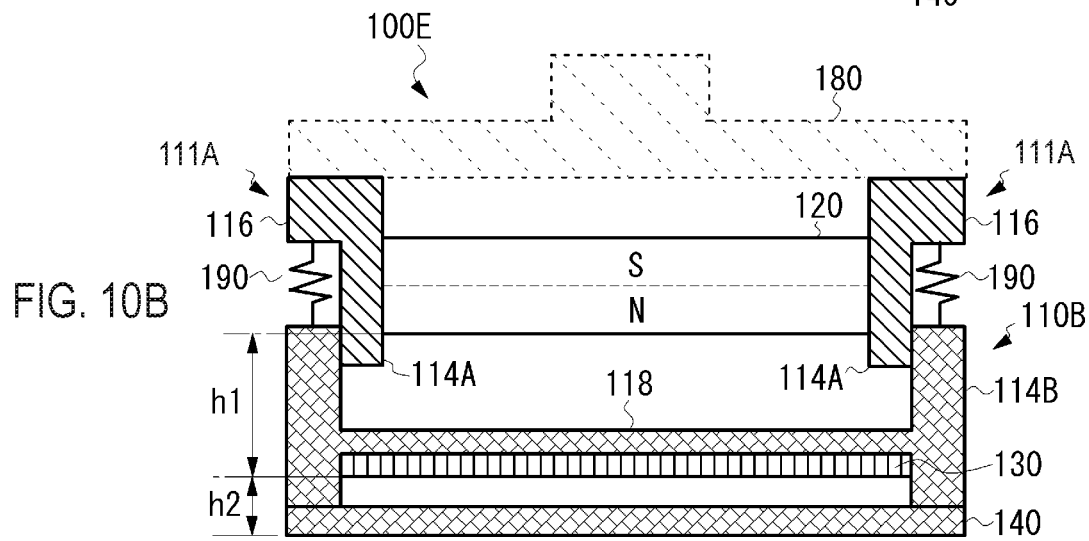
Figure 10C:
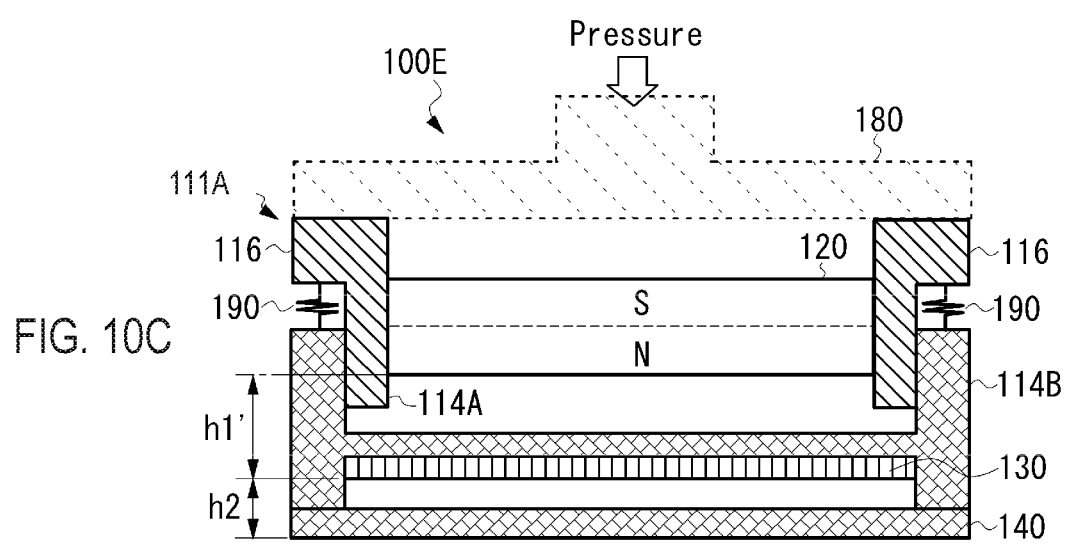
Figure 10D:
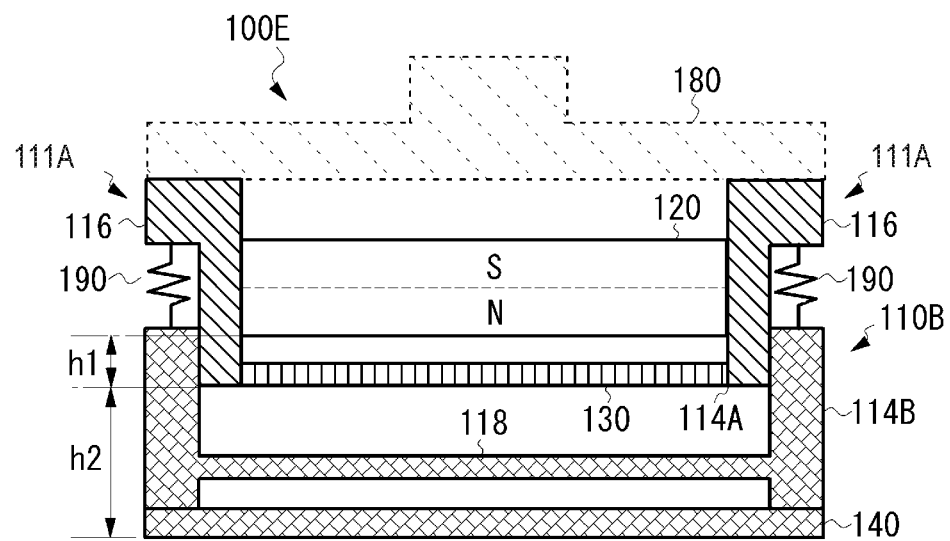
FIG. 10D and FIG. 10E depict schematic sectional views of the magnetic eraser with the height h2 variable according to the fifth embodiment of the present invention.
Figure 10E:
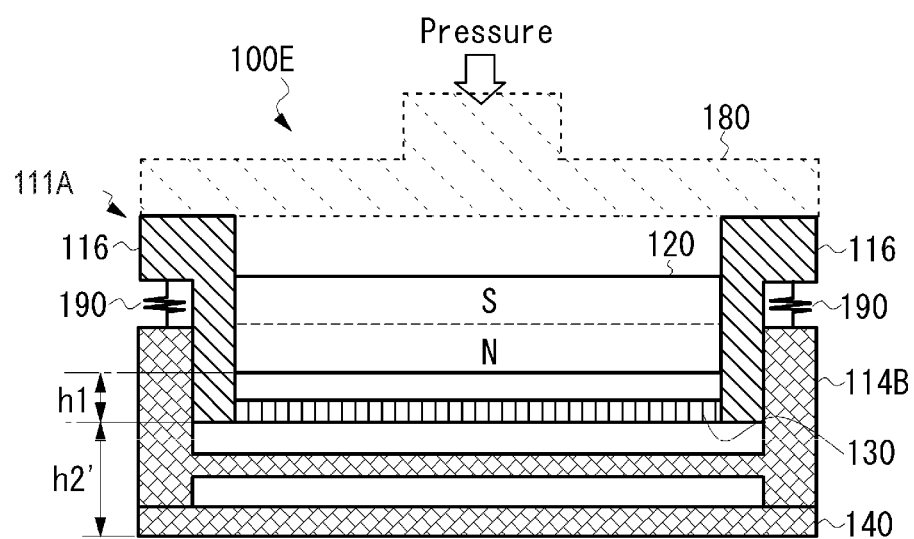

Now, the sixth embodiment of the present invention is described. FIG. 10A is a longitudinal sectional view of the magnetic eraser according to the sixth embodiment, FIG. 10B shows a state of the magnet spaced apart from the magnetic body, and FIG. 10C shows a state with the magnet approached by the magnetic body. The magnetic eraser 100E according to the sixth embodiment includes an adjusting mechanism to vary the distance h1 between the magnet 120 and the magnetic body 130 and the distance h2 between the magnetic body 130 and the bottom surface of the housing (in this case, the bottom surface of the sliding member 140).

The adjusting mechanism shown in FIGS. 10B and 10C is to fix the distance h2 and vary the distance h1. The magnetic eraser 100E includes a first housing portion 11A for holding the magnet 120 and a second housing portion 110B for holding the magnetic body 130. The first housing portion mA is formed of magnetic material and holds the magnet 120 on the inside of the sidewall 114A. Any method for holding may be used. For example, the ends of the magnet 120 may be fixed by glue, or the fixing member 122 may be used as shown in the first embodiment. A step portion 116 may is provided at the top end of the sidewall 114A of the first housing portion 11A. One end of a spring 190 is fixed to the step 116.

The second housing portion 110B includes a sidewall 114B engaging to the sidewall 114A of the first housing portion 111A, a bottom portion 118 connected to the sidewall 114B, a magnetic body 130 attached to the bottom portion 118, and a sliding member 140 attached to the bottom portion of the sidewall 114B. The sidewall 114B, the bottom portion 118 and the sliding member 140 are formed of non-magnetic material. Any method for holding the magnetic body 130 and the sliding member 140 may be used. For example, they are held by glue or by appropriate materials for holding. The other end of the spring 190 is fixed to the top end of the sidewall 114B. The first housing portion 111A and the second housing portion 110B are energized in the direction apart from each other by the spring 190 and close together elastically.

As shown in FIG. 10B, when no load is applied by the operation portion 180, the bottom portion of the sidewall 114A of the first housing portion 111A has the distance h1 from the bottom portion 118 of the second housing portion 110B. The distance between the magnetic body 130 and the bottom surface of the sliding member 140 is h2 that is fixed. As shown in FIG. 10C, when the user pushes the operation portion 180, the first housing portion 111A approaches the second housing portion 110B against the elastic force of the spring 190, which narrows the distance between the bottom portion of the sidewall 114A of the first housing portion 111A and the bottom portion 118 of the second housing portion 110B to the distance h1'. In other words, while the distance h2 between the magnetic body 130 and the sliding member 140 is constant, the distance h1 between the magnet 120 and the magnetic body 130 is variable, thereby varying the strength and direction of the magnetic force lines acting on the magnetic sheet.

In an embodiment, when the first housing portion 111A is pushed down, the first housing portion 111A may be held in a certain position. For example, a protrusion may be provided on the sidewall 114A of the first housing portion 111A, and a recess may be provided on the sidewall 114B of the second housing portion 110B. The position of the first housing portion 111A may be held by the protrusion engaging the recess. This enables the magnetic eraser 100D to slide on the magnetic sheet for erasing, with keeping a certain constant distance h1' between the magnet 120 and the magnetic body 130.

In another embodiment, the distance h1' may be held constant by the bottom portion of the sidewall 114A of the first housing portion 111A being contacted to the bottom portion 118 of the second housing portion 110B. Other than the flat surface, the bottom portion 118 may include a projected stopper at the contacting portion with the bottom portion of the sidewall 114A. When the sidewall 114A is contacted with the bottom portion 118, the distance h1' is 0. The user can slide the magnetic eraser with the operation portion 180 pushed down to erase characters etc. on the magnetic sheet. Alternatively, to keep the distance h1' constant, the first housing portion 111A may be pushed down toward the second housing portion 110B until the spring 190 is completely compressed. Also in this case, the user may slide the magnetic eraser with the operation portion pushed down. However, it should be noted that the distance h1' is not necessarily constantly locked as described above, and the distance h1' may be varied flexibly according to the application force of the user.

Thus, according to the embodiment, when the operation portion 180 of the magnetic eraser 100E is pushed down, the distance between the magnet 120 and the magnetic body 130 is relatively narrowed. This makes the magnetic field stronger, thereby easily erasing characters etc. that are drawn in a condition difficult to be erased. For example, as time passes, drawn characters etc. may be difficult to be erased, which is one characteristic of magnetic sheets. Thus, stronger magnetic force lines (magnetic field) may be required. On the other hand, constant strength magnetic force lines cause the weak contrast because the erasing surface became gray. Therefore, the mechanism to vary the distance is required.

The adjusting mechanism shown in FIG. 10A is to vary the distance h2 with the distance h1 fixed. In this case, the first housing portion 111A holds the magnet 120 and the magnetic body 130 below the magnet 120. On the other hand, the second housing portion 110B holds the sliding member 140 on the bottom surface of the sidewall 114B.

As shown in FIG. 10A(A), when no load is applied by the operation portion 180, the distance between the magnet 120 and the magnetic body 130 is h1, and the distance between the magnetic body 130 and the sliding member 140 is h2. As shown in FIG. 10A(B), when the user pushes the operation portion 180 down, the first housing portion 111A approaches the second housing portion 110B against the elastic force of the spring 190, which narrows the distance between the magnetic body 130 and the sliding member 140 to h2'. That is, while the distance h1 between the magnet 120 and the magnetic body 130 is constant, the distance h2 between the magnetic body 130 and the sliding member 140 is variable, thereby varying the strength and direction of the magnetic force lines acting on the magnetic sheet.

As one variation of the sixth embodiment, the combination of the configurations of FIG. 10 and FIG. 10A enables both of the distance h1 between the magnet 120 and the magnetic body 130 and the distance h2 between the magnetic body 130 and the sliding member 140 to be variable. In other words, the first housing portion 111A holds the magnet 120 and the first magnetic body 130 as shown in FIG. 10A, and the second housing portion 110B holds the second magnetic body 130 as shown in FIGS. 10B and 10C. This configuration enables the distance h1 between the magnet 120 and the second magnetic body 130 and the distance h2 between first magnetic body 130 and the sliding member 140 to be varied when the user pushes the operation portion 180 down.

Now the seventh embodiment according to the present invention is described. FIG. 11A shows longitudinal sectional views and lateral sectional views of the housing used in the magnetic eraser of the seventh embodiment. The housing 200 includes a center partition wall 210 with a certain constant thickness t3, and four walls 220, 222, 224, 226 connected to the center partition wall 210, that are formed of non-magnetic material. A rectangular upper space SA is provided above the center partition wall 210, and a rectangular lower space SB is provided below the center partition wall 210. At this time, the lower space SB has the depth h7.

As shown in FIG. 11B, the magnet 120 is placed in the upper space SA of the housing 200, and the magnetic body 130 is placed in the lower space SB. The thickness of the magnetic body 130 is h8 (h8<h7). FIG. 11C shows an example with the lower space SB closed by the sliding member 140. In this case, the gap is formed between the sliding member 140 and the magnetic body 130 with the height h7-h8. FIG. 11D shows an example with the sliding member 140 formed only on the bottom portions of the sidewalls 220-226 and the magnetic body 130 exposed.

Thus, the use of the housing 200 in which the center partition wall 210 defines the upper space SA and the lower space SB eliminates the need for the alignment of the magnet 120 and the magnetic body 130, thereby easily manufacturing magnetic erasers. Further, the distance between the magnetic body 130 and the sliding member 140 is adjustable according to the depth of the lower space SB. Although the rectangular upper space SA and the rectangular lower space SB are shown as an example, the upper space and lower space may have different sizes or shapes according to the magnet and the magnetic body to be used.

Figure 12A:
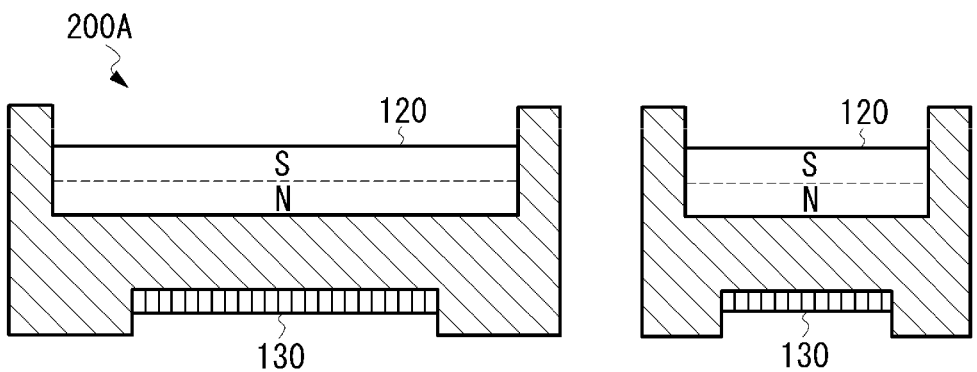
FIGS. 12A, 12B and 12C depict sectional views of the housing according to the seventh embodiment of the present invention.
Figure 12B:
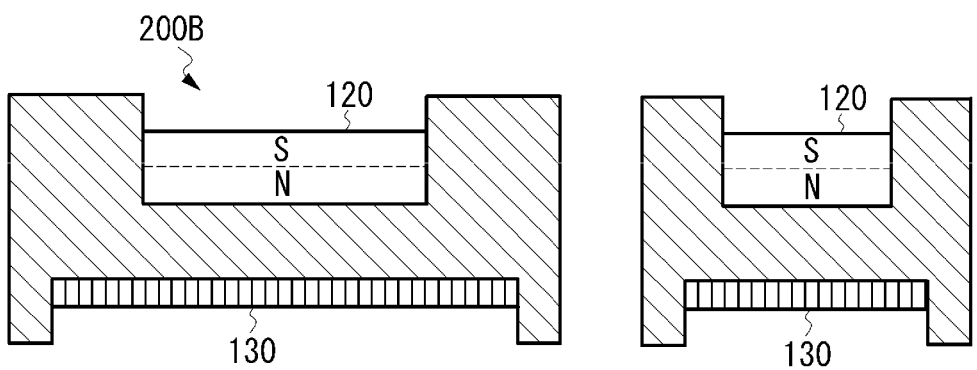
Figure 12C:
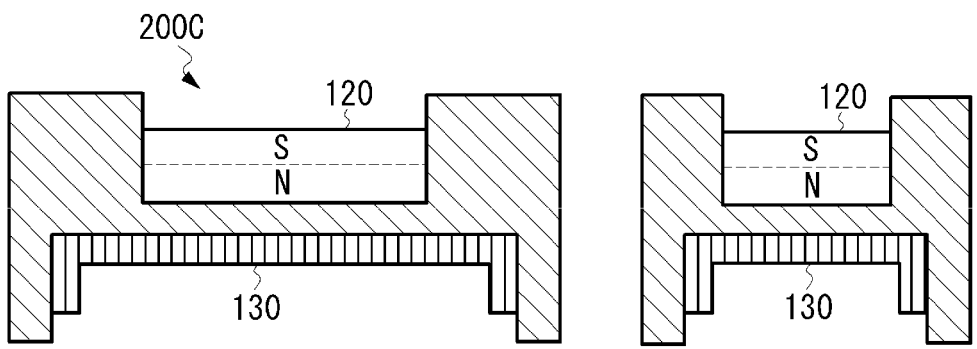

FIG. 12 shows a variation of the seventh embodiment. When the magnet 120 is larger than the magnetic body 130, the housing 200A having the upper space larger than the lower space is used as shown in FIG. 12A. On the contrary, when the magnetic body 130 is larger than the magnet 120, the housing 200B having the upper space smaller than the lower space is used as shown in FIG. 12B. Further, as shown in FIG. 12C, the magnetic body 130 may have a right angle U-shaped section with leg potions formed at the end. This prevents the magnetic forces to exit from the magnet 120 to the outside of the housing.

Figure 13:
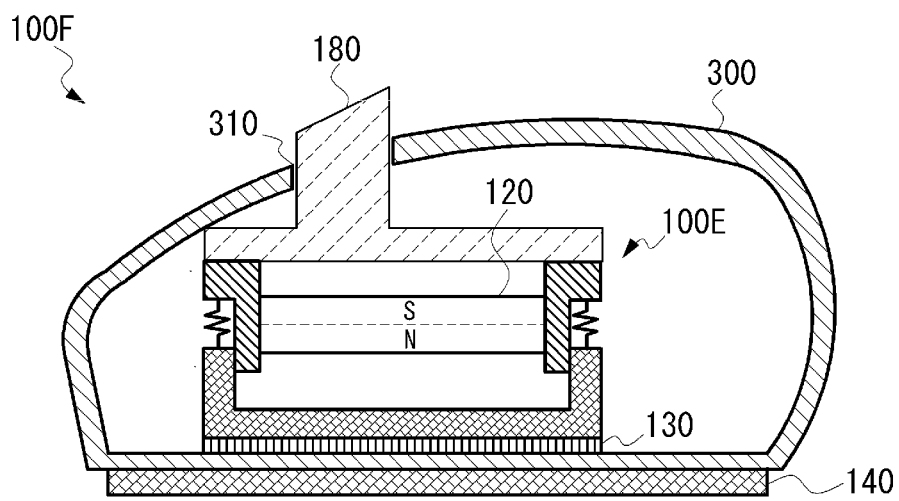
FIG. 13 is a schematic sectional view of the magnetic eraser according to the eighth embodiment of the present invention.

Now, the eighth embodiment according to the present invention is described. A magnetic eraser 100F of the eighth embodiment has a mouse-shaped housing 300 as shown in FIG. 13. The housing 300 is formed of non-magnetic material such as plastic etc. The magnetic eraser 100E having the adjusting mechanism as explained in the sixth embodiment is accommodated in the inner space of the housing 300. An opening 310 is provided in the upper portion of the housing 300 to protrude the operation portion 180. The sliding member 140 is attached on the bottom surface of the housing 300 if required. Drawn characters etc. may be erased by sliding the mouse on the magnetic sheet. Further, when the user wants to vary the erasing ability, that is, to increase the magnetic force, the user may push the operation portion 180 down to approach the magnet 120 to the magnetic body 130.

The magnetic eraser according to the embodiment, as well as the magnetic pen and the magnetic sheet, constitute a magnetic display device and/or magnetic displaying system. Characters etc. are drawn on the magnetic sheet by the magnetic pen, and such drawn characters are erased by the magnetic eraser. Further, the magnetic display device may have a function as a whiteboard on which characters etc. are drawn by markers and a function as a screen on which images are projected by a projector. That is, drawings by markers and drawings by magnetic pens are overlaid on the magnetic sheet and such drawings by magnetic pens are erased by the magnetic eraser. Alternatively, drawings by magnetic pens are overlaid on images projected on the magnetic sheet, and such drawings by magnetic pens are erased by the magnetic eraser.

While the preferable embodiments has been described in detail, the present invention is not limited to such specific embodiments. Modifications and variations are possible within the scope of the present invention as defined by the claims.

What is claimed is:

1. A magnetic eraser for erasing markings drawn on a magnetophoretic type magnetic sheet, the magnetophoretic type magnetic sheet including a plurality of microcapsules two-dimensionally arranged, each microcapsule including magnetic particles which are moved by applying lines of magnetic force, the magnetic eraser comprising:
   a housing;
   a magnet placed in the housing; and
   a first magnetic body placed between a first surface of the housing and the magnet, the first magnetic body controlling a strength and direction of the magnetic force generated from the magnet, the magnet and the first magnetic body being rotationally fixed inside the housing,
   wherein the first surface of the housing provides a first erasing surface, the first surface of the housing being substantially parallel to a surface of the magnet and substantially parallel to a surface of the first magnetic body, and wherein air gaps are formed between the surface of the magnet and the surface of the first magnetic body and between the surface of the first magnetic body and the surface the first surface respectively.

2. The magnetic eraser of claim 1, further comprising:
   a second magnetic body placed between a second surface of the housing and the magnet, the second surface being opposed to the first surface, wherein the second surface of the housing provides a second erasing surface, and wherein the second surface of the housing is substantially parallel to the surface of the magnet and the surface of the first magnetic body.

3. The magnetic eraser of claim 2, wherein the magnet is spaced a first distance apart from the first surface of the housing and spaced a second distance apart from the second surface of the housing, the first magnetic body controls magnetic force lines from the magnet, the second magnetic body controls magnetic force lines of the magnet, and the first erasing surface and the second erasing surface have different erasing abilities.

4. The magnetic eraser of claim 1, further comprising an adjusting mechanism configured to vary a distance between the magnet and the first surface of the housing.

5. The magnetic eraser of claim 4, wherein the adjusting mechanism varies a distance h1 between the magnet and the first magnetic body or a distance h2 between the first surface of the housing and the first magnetic body.

6. The magnetic eraser of claim 4, wherein the housing includes a first housing portion configured to hold the magnet and a second housing portion configured to hold the first magnetic body, and the adjusting mechanism varies a relative position of the first housing portion and the second housing portion.

7. The magnetic eraser of claim 4, wherein the housing includes a first housing portion configured to hold the magnet and the first magnetic body and a second housing portion configured to hold the first surface of the housing; and wherein the adjusting mechanism varies a relative position of the first housing portion and the second housing portion.

8. The magnetic eraser of claim 6, wherein the adjusting mechanism includes an operation portion that can press the first housing portion to the second housing portion.

9. The magnetic eraser of claim 1, further comprising:
   a spacer between the magnet and the first magnetic body, the spacer comprising a non-magnetic material, wherein a distance between the magnet and the first magnetic body is determined by a thickness of the spacer.

10. The magnetic eraser of claim 1, wherein a sliding member of a non-magnetic material is provided on the first surface of the housing.

11. The magnetic eraser of claim 1, further comprising:
an outer magnetic body configured to control a spread of magnetic force lines, the outer magnetic body being disposed on at least a part of an outer surface different from the first surface of the housing.

12. The magnetic eraser of claim 1, further comprising:
a small area erasing portion attached to the housing, the small area erasing portion including:
  a small area housing;
  a magnet placed in the small area housing; and
  a third magnetic body placed between a third surface of the small area housing and the magnet of the small area,
wherein the third surface of the housing provides a third erasing surface.

13. The magnetic eraser of claim 12, wherein the small area erasing portion is placed on at least a part of an outer surface different from the first surface of the housing.

14. The magnetic eraser of claim 12, wherein the small area erasing portion is placed at a corner in the housing.

15. The magnetic eraser of claim 1, wherein the housing includes a partition wall configured to partition a first space and a second space;
wherein the magnet is placed in the first space, and the first magnetic body is placed in the second space;
wherein the housing is formed of a non-magnetic material; and
wherein a distance between the magnet and the first magnetic body is adjusted by a thickness of the partition wall.

16. The magnetic eraser of claim 15, wherein the first space defines a first shape for positioning the magnet, and the second space defines a second shape for positioning the first magnetic body.

17. The magnetic eraser of claim 16, wherein the first shape and the second shape are different in size.

18. The magnetic eraser of claim 1, wherein the housing comprises a mouse-shape, and the first surface is formed on a bottom surface of the mouse-shape.

19. The magnetic eraser of claim 18, wherein an operation portion configured to vary a distance between the magnet and the first magnetic body is disposed on an upper portion of the mouse-shape, and the distance between the magnet and the first magnetic body is narrowed by pressing the operation portion.

20. A writing system comprising:
a magnetic eraser comprising:
  a housing;
  a magnet placed in the housing; and
  a first magnetic body placed between a first surface of the housing and the magnet,
  the first magnetic body controlling a strength and direction of the magnetic force generated from the magnet, the magnet and the first magnetic body being rotationally fixed inside the housing,
wherein the first surface of the housing provides a first erasing surface, the first surface of the housing being substantially parallel to a surface of the magnet and substantially parallel to a surface of the first magnetic body, and wherein air gaps are formed between the surface of the magnet and the surface of the first magnetic body and between the first magnetic body and the first surface respectively;
a magnetophoretic type magnetic sheet, the magnetophoretic type magnetic sheet including a plurality of microcapsules two-dimensionally arranged, each microcapsule including magnetic particles which are moved by applying lines of magnetic force; and
a magnetic pen or magnetic stamp configured draw markings on the magnetic sheet,
wherein moving the magnetic eraser on the magnetic sheet enables markings drawn on the magnetic sheet to be erased.

21. A display device comprising:
a magnetic eraser comprising:
  a housing;
  a magnet placed in the housing; and
  a first magnetic body placed between a first surface of the housing and the magnet, the first magnetic body controlling a strength and direction of the magnetic force generated from the magnet, the magnet and the first magnetic body being rotationally fixed inside the housing,
wherein the first surface of the housing provides a first erasing surface, the first surface of the housing being substantially parallel to a surface of the magnet and substantially parallel to a surface of the first magnetic body, and wherein air gaps are formed between the surface of the magnet and the surface of the first magnetic body and between the first magnetic body and the first surface respectively;
a magnetophoretic type magnetic sheet, the magnetophoretic type magnetic sheet including a plurality of microcapsules two-dimensionally arranged, each microcapsule including magnetic particles which are moved by applying lines of magnetic force; and
a magnetic pen or magnetic stamp configured to draw markings on the magnetic sheet,
wherein moving the magnetic eraser on the magnetic sheet enables markings drawn on the magnetic sheet to be erased.

22. The display device of claim 21, wherein the magnetic sheet is configured to be used as an electronic whiteboard on which drawings are drawn with markers or inks.

23. The display device of claim 21, wherein the magnetic sheet is configured to be used as a screen for displaying images projected by a projector.

* * * * *